Sept. 16, 1958　　　C. F. SPAHN, JR　　　2,852,736
RELAY TEST RECORDER
Filed April 10, 1957　　　　　　　　2 Sheets-Sheet 1

INVENTOR
C. F. SPAHN, JR.
BY Walter M. Hill
ATTORNEY

INVENTOR
C. F. SPAHN JR.
BY *Walter M. Hill*
ATTORNEY

United States Patent Office 2,852,736
Patented Sept. 16, 1958

2,852,736
RELAY TEST RECORDER

Charles F. Spahn, Jr., Roslyn Heights, N. Y., assignor to Bell Telephone Laboratories, Incorporated, New York, N. Y., a corporation of New York Application April 10, 1957, Serial No. 651,863

5 Claims. (Cl. 324—28)

This invention relates to a relay testing device and more particularly to a device which measures and records the make and break points of relay contacts during the travel of the relay armature.

In both the laboratory and the factory, large numbers of relays and similar switching apparatus are checked for their ability to maintain the adjustment of their contact springs under various operating conditions, such as temperature, humidity, vibration, et cetera. The relays are usually checked by gauging them before and after they are subjected to one of the operating conditions in order to determine the changes in the adjustment of the contact springs that occurred during the test. This gauging is generally done by manually inserting thickness gauges between the core and armature in .001 inch steps, energizing the coil, observing for what thickness gauge the contacts operated, and recording the measurements. This procedure will provide an indication of the make and break points of the relay contacts during the travel of the relay armature. However, the procedure is time-consuming and requires skill in inserting the gauges in the proper manner each time.

It is a primary object of this invention to more quickly and expeditiously measure and record the points at which relay contacts operate during the travel of the relay armature.

It is a further object of the invention to provide a device which automatically measures and records the operate points of relay contacts and which requires very little skill or effort on the part of the operator.

In accordance with the principles of the present invention, the relay to be tested is clamped to the frame of the testing device by means provided therefor. A ratchet and pawl arrangement is then actuated periodically through a pulse operated stepping magnet and the ratchet in turn acts through gearing means to cause a step-like incremental movement of the relay armature as well as of a perforator tape. This armature movement will result in the operation of the relay contacts and, by having each set of contacts connected in series with a perforating magnet and a direct current source, the make and break points of said contacts will thus be recorded on the perforator tape.

Other objects and features of the invention will be more readily understood from the following detailed description taken in conjunction with the accompanying drawings in which.

Figure 1:
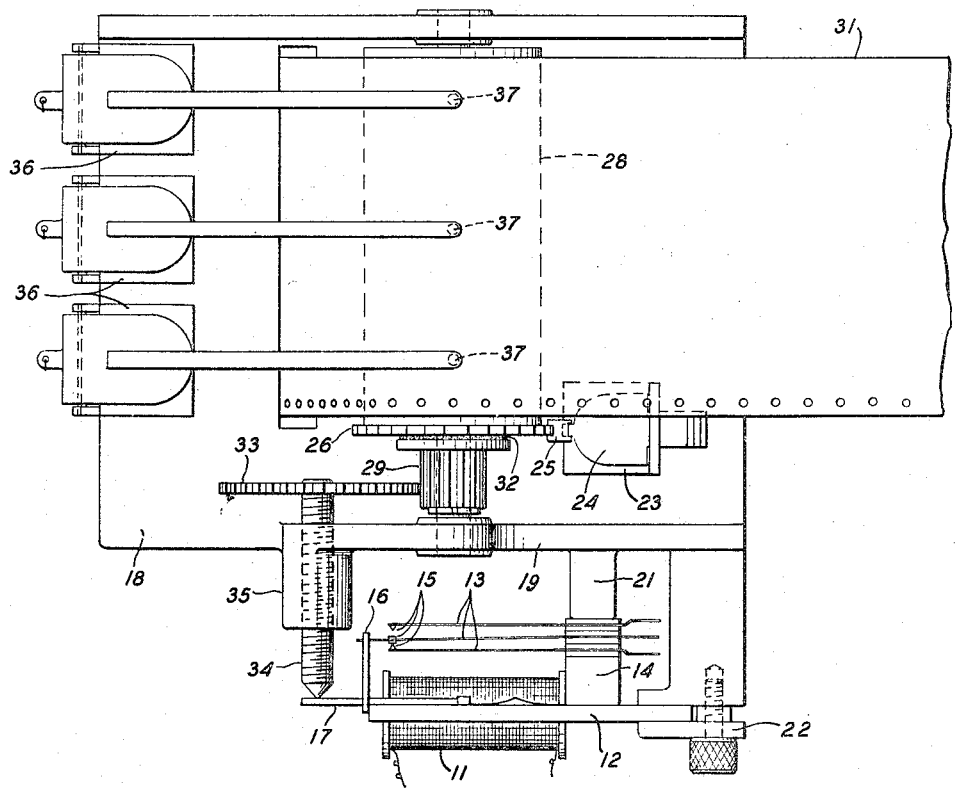
Fig. 1 is a top view of the testing device in accordance with the present invention with the relay to be tested mounted thereon.
Figure 2:
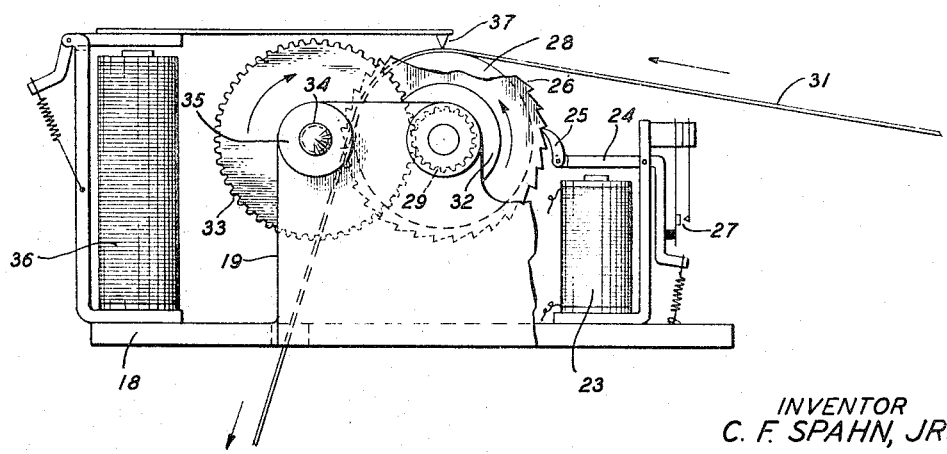
Fig. 2 is a broken side elevation view of the testing device of Fig. 1.
Figure 3:
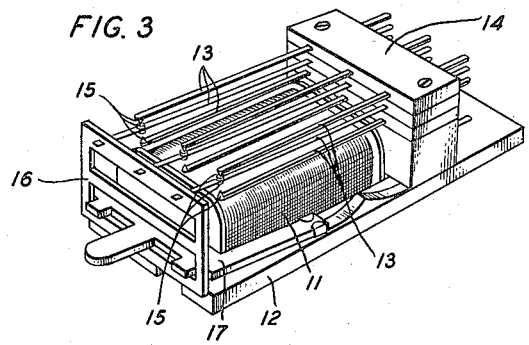
Fig. 3 is a perspective view of a typical relay to be tested.

Before proceeding with a detailed description of the present invention, reference may be had to Fig. 3 which shows in simplified form a relay adapted to be tested using the testing device of Figs. 1 and 2. This simplified relay has been shown only by way of example, and it will become apparent to those skilled in the art that other and various types of relays and switching devices may be tested in accordance with this invention. The relay to be tested comprises a coil 11 mounted upon a metallic core 12 and a plurality of contact springs 13 all fixedly mounted near one end in the insulating block 14. The centrally disposed contact springs extend beyond the contact points 15, with the ends thereof secured in the insulating card 16. Insulating card 16 is maintained in contact with the armature 17 (by means not shown) so as to follow the movements of the armature and transmit the same to the centrally disposed contact springs. Energization of the relay coil 11 causes the armature 17 to move downwardly from the position shown in Fig. 3 with the result that some of the contacts make while others break. It is the purpose of the present invention to measure and record the precise points in the travel of the armature at which this making and breaking occurs.

Referring now to Figs. 1 and 2 of the drawings, the frame 18 of the testing device is provided with an upstanding wall portion 19 on which there is mounted a boss 21. The relay to be tested is fixedly secured to the testing device by clamping the core 12 thereof in the screw type clamp 22 with the insulating block 14 in abutment against the boss 21. A stepping magnet 23 is also mounted on the frame 18, and in response to pulses from a source not shown the coil thereof causes a periodic actuation of lever arm 24. Each actuation of the lever arm acts through the pawl 25 to rotate the ratchet wheel 26 in a counterclockwise direction by one notch and in addition temporarily closes the contacts 27.

A drum 28 is mounted upon the same shaft as the ratchet wheel 26 so as to rotate therewith and thus transmit the step-like movement of the ratchet wheel to the perforator or recording tape 31. This movement of the ratchet wheel 26 is also transmitted to the gear 29 by means of a friction clutch 32. In mesh with gear 29 is another gear 33 which is fixedly secured to the threaded shaft 34. Shaft 34 is threaded into the boss or hub 35 of the frame so that upon rotation of gear 33 the shaft will move in an axial direction toward or away from the drum 28. The gear 29 is sufficiently wide to permit the gear 33 to move along the gear 29 as it rotates. The gear ratio and the pitch of the threads on the shaft 34 determine the amount the shaft moves for each displacement of the ratchet wheel and drum. It is desirable that a comparatively large rotational movement of the ratchet wheel and drum results in a small axial displacement of the threaded shaft 34. For example, a gear ratio and pitch can be provided wherein a one notch rotation of the ratchet wheel causes the shaft 34 to move .001 inch.

A plurality of perforator magnets 36 are mounted upon the frame 18, and upon energization thereof, the sharpened points 37 are caused to pierce the perforator tape 31. Recesses (not shown) are provided in the drum 28 for the purpose of receiving the points 37 when the same are in the depressed position.

After the relay to be tested is clamped to the frame of the testing device and the relay armature is held in its operated or energized position by the point of the shaft 34, the stepping magnet 23 is connected to a pulse producing circuit (not shown). The pulses from said circuit periodically energize the stepping magnet to produce a step-like rotation of the ratchet wheel and this in turn causes a similar type movement of the drum and tape as well as gear 33. Rotation of gear 33 results in an axial movement of the shaft 34 away from the relay under test, and the armature of the relay follows this shaft movement inasmuch as the coil of the relay is not energized. There is thus produced a step-like incremental movement of the armature during which the relay contacts 15 operate by either making or breaking.

Figure 4:
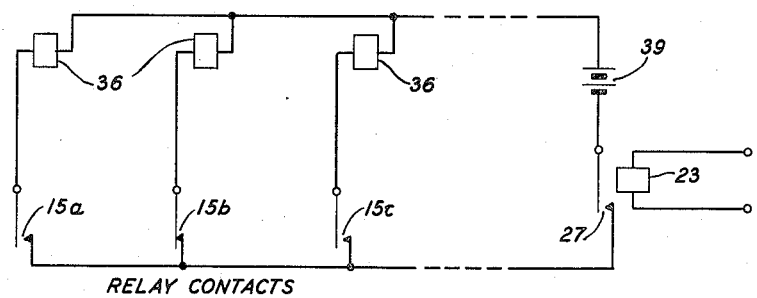
Fig. 4 is a schematic diagram of the circuit of the testing device.

As illustrated in Fig. 4 of the drawings, the sets of contacts of the relay under test are each connected in series with a perforating magnet 36 and each of these series combinations are in turn in series with battery 39 and contacts 27. Thus each time the stepping magnet 23 is energized, the contacts 27 close and a hole is punched in the tape 31 by those perforating magnets connected in series with a closed set of relay contacts. For example, with the relay contacts positioned as shown in Fig. 4, the energization of the stepping magnet 23 results in the energization of the perforating magnet in series with relay contacts 15b, the other perforating magnets remaining deenergized due to the open series contacts. While only three perforating magnets and three sets of relay contacts have been shown, actually there would be many more perforating magnets and the number of magnets required would depend upon the number of contacts on the relay to be measured.

Figure 5:
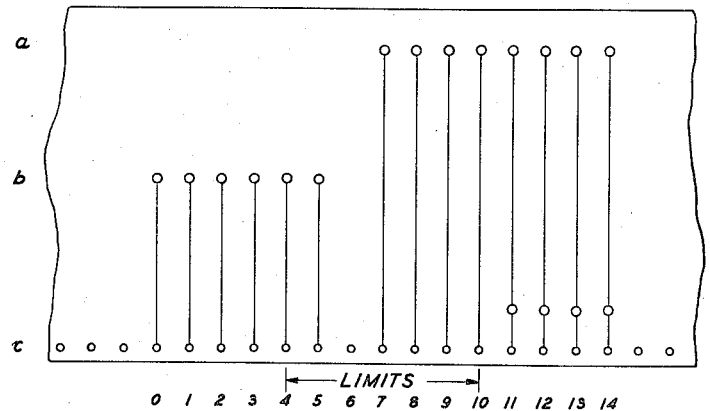
Fig. 5 is a diagrammatic view of a tape perforated in accordance with this invention.

Fig. 5 is a view of a tape that would be produced for a relay having three sets of contacts to be tested. Each horizontal row of holes on the tape represents the operating conditions for one set of contacts and each vertical row represents an increment of armature motion, .001 inch steps having been chosen by way of example. Thus it is apparent that the contacts producing row b were initially closed but then opened after an armature travel of .005 inch, while the contacts producing rows a and c were initially open but then closed after an armature travel of .007 and .011, respectively. If the specified limits for the contacts are between .004 and .010 inch, the tape shows that contacts c made outside the limits and contacts a and b made within limits. By superimposing a tape made after a relay has been subjected to one of the various operating conditions upon one made before, the changes that occurred could be readily determined.

After the next relay to be measured is secured to the frame, the shaft 34 is advanced until the armature of the relay is in its operated or energized position. This is accomplished simply by manually rotating the gear 33 counterclockwise. The pawl 25 will of course prevent any rotation of the ratchet wheel 26 and drum 28 and thus a little slippage takes place in friction clutch 32. The testing device is now ready to measure and record the operate points of this next relay.

It is to be understood that the above described embodiment is merely illustrative of the principles and application of the present invention. Numerous other arrangements may be readily devised by those skilled in the art without departing from the spirit and scope of the invention.

What is claimed is:

1. In a relay testing arrangement for measuring and recording the make and break points of relay contacts, a periodic pulse operated stepping magnet, means acting in response to the periodic operation of said stepping magnet to move the armature of the relay under test by predetermined incremental amounts, a recording tape, means connected to the first-mentioned means for moving said recording tape by predetermined amounts in response to the actuation of the said first-mentioned means, a plurality of recording means each disposed with respect to said tape to produce a mark thereon when energized, each set of contacts of the relay under test being connected in series with one of said recording means, and means connecting each of these series combinations in series with a source of energy and with contacts on said stepping magnet so that each of said recording means will be energized to produce a mark on said tape whenever the stepping magnet is pulse operated and said set of contacts in series therewith are making.

2. A relay testing device adapted to measure and record the make and break points of relay contacts during the travel of the relay armature comprising, a clamp adapted to secure the relay to be tested to the relay testing device, a shaft threaded into a stationary boss member on said testing device and operative to move in an axial direction upon rotation thereof, said shaft being adapted to engage the armature of the relay under test and move the same as the shaft is caused to move in an axial direction, a pulse operated stepping magnet, a ratchet and pawl means operative in response to energization of said stepping magnet to rotate said shaft by predetermined incremental amounts, a recording tape, means connected to said ratchet and pawl means for moving said recording tape by predetermined amounts in response to actuation of said ratchet and pawl means, a plurality of recording means each disposed with respect to said tape to produce a mark thereon when energized, each set of contacts of the relay under test being connected in series with one of said recording means, and contact means interconnecting each of these series combinations with a source of energy each time said stepping magnet is pulse operated.

3. A relay testing device comprising a clamp for securing a relay to be tested to said testing device, a shaft threaded into a stationary boss member on said testing device and operative to move in an axial direction upon the rotation thereof, the end of said shaft engaging the armature of the relay under test to move the same as the shaft is caused to move in an axial direction, a pulse operated stepping magnet, a pawl operative in response to energization of said stepping magnet to cause an intermittent rotation of a ratchet, gearing means operative in response to said rotation of said ratchet to rotate said shaft and axially move the same by predetermined incremental amounts, a recording drum mounted upon the same shaft as said ratchet so as to rotate therewith and thus move a recording tape by predetermined amounts, a plurality of perforating magnets each operative upon energization thereof to punch a hole in said tape, each set of contacts of the relay under test being connected in series to one of said perforating magnets, and means connecting each of these series combinations in series with a source of energy and with contacts on said stepping magnet so that each of said perforating magnets will be energized whenever said stepping magnet is pulse operated and said set of contacts in series therewith are making.

4. In a relay testing arrangement for measuring and recording the make and break points of relay contacts, periodic pulse operative means for moving the armature of the relay under test by predetermined incremental amounts, a recording tape, means connected to said pulse operative means for moving said recording tape by predetermined amounts in response to the periodic operation of said pulse operative means, a plurality of recording means each disposed with respect to said tape to produce a mark thereon when energized, each set of contacts of the relay under test being connected in series with one of said recording means, and means interconnecting each of these series combinations with a source of energy each time said pulse operative means is pulse operated.

5. In a relay testing arrangement for measuring and recording the make and break points of relay contacts, a periodic pulse operated stepping magnet, means acting in response to the periodic operation of said stepping magnet to move the armature of the relay under test by predetermined incremental amounts, a recording tape, means connected to the first-mentioned means for moving said recording tape by predetermined amounts in response to the actuation of the said first-mentioned means, a plurality of recording means each disposed with respect to said tape to produce a mark thereon when energized, each set of contacts of the relay under test being connected in series with one of said recording means, and contact means interconnecting each of these series combinations with a source of energy each time said stepping magnet is pulse operated.

References Cited in the file of this patent

UNITED STATES PATENTS 2,298,235    Seitz et al. _____ Oct. 6, 1942